Nov. 29, 1966    J. GERSCH ET AL    3,288,389
FILM CARTRIDGE
Filed Feb. 2, 1965
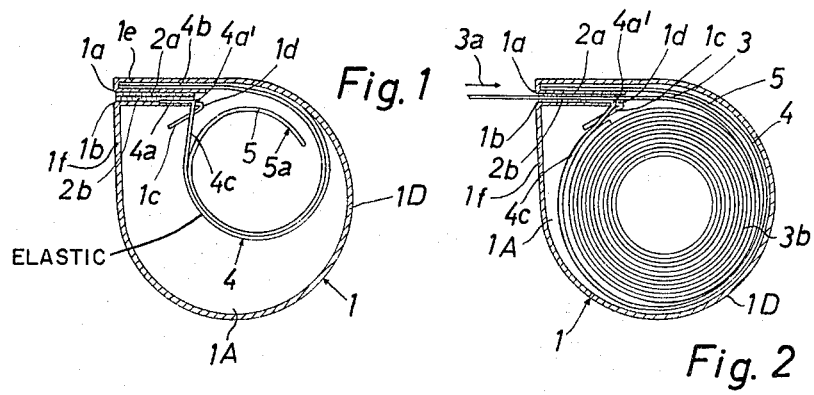
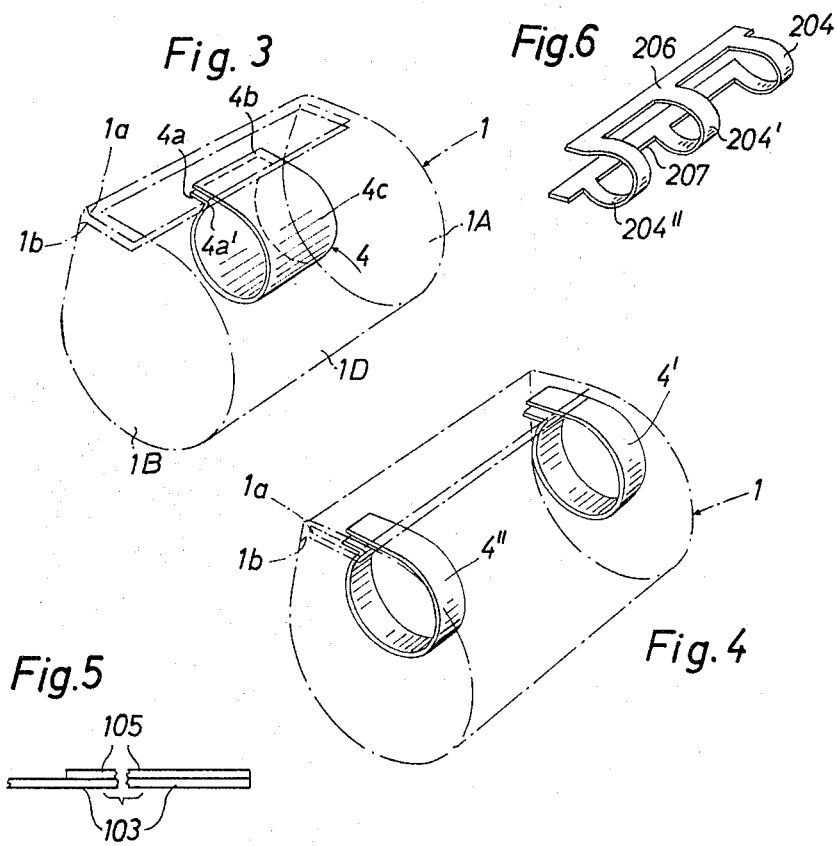
INVENTOR.
JOSEF GERSCH
HEINZ MEGLIN
BY United States Patent Office 3,288,389
Patented Nov. 29, 1966

3,288,389
FILM CARTRIDGE
Josef Gersch, Unterhaching, Munich, and Heinz Meglin, Munich, Germany, assignors to Agfa Aktiengesellschaft, Leverkusen, Germany
Filed Feb. 2, 1965, Ser. No. 429,984
Claims priority, application Germany, Feb. 12, 1964, A 45,207
20 Claims. (Cl. 242—71.1)

The present invention relates to film cartridges for use in photographic cameras. More particularly, the invention relates to improvements in cartridges of the type wherein the film may be coiled without being connected to a rotary spool. Such cartridges are known as coreless cartridges.

It is already known to provide a coreless cartridge with a helical spring installed in the interior of the housing and serving to convolute the film which is being fed through the light trap of the mouth and into the housing. A serious drawback of such springs is that their elastic characteristics change with time or in different climates, and also that they cannot insure the formation of a film roll which is and remains a circular cylinder. The characteristics of coiled metallic springs depend on many factors including thickness, the nature of their material and others. It happens again and again that the roll of convoluted film in a fully loaded cartridge takes the form of a cylinder which is of oval or other non-circular cross section despite the fact that the film is biased by a helical spring. The drawbacks of such rolls are self-evident.

Accordingly, it is an important object of the present invention to provide a coreless film cartridge which is constructed and assembled in such a way that its parts automatically compel a length of film to assume a truly circular cylindrical shape when the film is introduced through the light trap and into the interior of the housing.

Another object of the invention is to provide an improved nonmetallic convoluting device which enables the cartridge to form a film roll of circular cross section and which insures that the roll retains such shape for any desired period of time.

A further object of the invention is to provide a film cartridge of the above outlined characteristics which may be loaded with film in response to exertion of a small force, wherein the film is not likely to be scratched or otherwise damaged during insertion into or withdrawal from the housing, and whose dimensions do not deviate from the dimensions of presently used cartridges so that it may be installed in all such cameras which are built for use with coreless cartridges.

An additional object of our invention is to provide a cartridge of the above outlined characteristics wherein the mantle of the housing need not be of truly cylindrical shape but the cartridge is still capable of preventing deformation or uncontrolled expansion of convoluted film.

Briefly stated, one feature of our invention resides in the provision of a coreless film cartridge which comprises a hollow housing defining an elongated mouth provided with a light trap through which a length of film may be introduced into and convoluted in the housing, and at least one expansible elastic band which is mounted in the housing and comprises a looped median portion whose circumferential length in unexpanded condition of the band is less than the maximum circumferential length of the roll to be formed in the housing.

The novel features which are considered as characteristic of the invention are set forth in particular in the appended claims. The improved film cartridge itself, however, both as to its construction and the mode of manipulating the same, together with additional features and advantages thereof, will be best understood upon perusal of the following detailed description of certain specific embodiments with reference to the accompanying drawings, in which:

FIG. 1 is a transverse section through an empty film cartridge which is constructed and assembled in accordance with a first embodiment of our invention and which comprises a single elastic band;

FIG. 2 is a similar transverse section and illustrates the cartridge of FIG. 1 in nearly fully loaded condition;

FIG. 3 is a perspective view of the elastic band which is utilized in the cartridge of FIGS. 1 and 2, the remaining parts of the cartridge being indicated by phantom lines;

FIG. 4 is a similar perspective view of two elastic bands, the remaining parts of the cartridge being shown again by phantom lines;

FIG. 5 is a fragmentary side elevational view of a film one side of which is provided with a friction-reducing opaque liner; and FIG. 6 is a perspective view of a unit comprising three elastic bands which may be utilized in a cartridge of the type shown in FIGS. 1 to 3 or in FIG. 4.

Referring to FIGS. 1 to 3, the film cartridge therein shown comprises a hollow housing 1 which consists of metallic or rigid plastic material. The housing comprises two end walls 1A, 1B and a mantle or shell 1D having an elongated mouth defined by two flat inwardly extending panels 1a, 1b. The mouth accommodates a light trap here shown as consisting of two sealing strips 2a, 2b made of plush and bonded to the panels 1a, 1b to make sure that the interior of the housing 1 is invariably sealed against penetration of light rays. The film 3 is introduced lengthwise by advancing between the sealing strips 2a, 2b, see the arrow 3a in FIG. 2. When the cartridge is inserted into a still camera, the panel 1b is nearer to the film platform than the panel 1a.

The panels 1a, 1b constitute inwardly bent marginal portions of the mantle 1D, and these panels provide anchors for the terminal portions 4a, 4b of an elastic band 4 which is accommodated in the interior of the housing 1 and serves as a means for convoluting the film 3 as well as for maintaining the thus obtained roll 3b in convoluted condition. The terminal portion 4b of the band 4 is clamped, bonded or otherwise securely retained between the outer side of the panel 1a and the adjoining flat portion 1e of the mantle 1D. The other terminal portion 4a is received between the panel 1b and sealing strip 2b and is preferably secured to such parts by a strong adhesive. It is clear that the terminal portion 4b may be inserted between the panel 1a and strip 2a, and/or that the terminal portion 4a may be bonded to the outer side of the panel 1b (namely, to that side of the panel 1b which faces away from the panel 1a).

The median portion 4c of the band 4 forms a small loop which expands in response to continued admission of the film 3 through the slot defined by the terminal portions 4a, 4b, i.e., in response to gradually increasing diameter of the roll 3b. The band 4 consists of elastic material, for example, of natural or synthetic rubber which should not be electrically charged in response to frictional contact with the film. Such charging could produce sparks which would expose portions of the film during introduction into or withdrawal from the cartridge. The slot between the terminal portions 4a, 4b registers with the mouth of the housing 1, and the circumferential length of the median portion 4c in unexpanded condition of the band 4 is less than the maximum circumferential length of the roll 3b so that the median portion 4c must expand in response to continued admission of film between the sealing strips 2a, 2b.

We prefer to provide the band 4 with a flexible liner 5 which resembles a tongue and may consist of paper or plastic foil. One end portion of the liner 5 is anchored between the panel 1a and terminal portion 4b, and the other end of this liner extends freely into the interior of the median portion 4c. The material of the liner 5 is flexible but need not be elastic so that, when the band 4 is free to contract, the liner is coiled up in a manner as shown in FIG. 1 and forms at least one full convolution. In other words, the length of the liner 5 exceeds the circumferential length of the median portion 4c when the band 4 is free to contract. The purpose of the liner 5 is to reduce friction by keeping the film out of contact with the band.

The housing 1 accommodates flat barriers or stops in the form of flaps 1c which are disposed at both sides of the terminal portion 4a and extend substantially tangentially with reference to the roll 3b. The flaps 1c constitute the inner marginal portions of the panel 1b and are formed by bending such marginal portions through an angle of about 135 degrees in a direction away from the panel 1a so that the panel 1b develops a ridge 1d. The numeral 4a' denotes the line along which the looped median portion 4c of the band 4 is flexed when the diameter of the film roll 3b incresaes, and it will be noted that the line 4a' is more distant from the axis of the roll 3b, i.e., from the axis of the cylindrical main body portion of the mantle 1D, than the ridge 1d. Therefore, as the diameter of the roll 3b increases and the film 3 continues to advance into the housing 1, the outermost convolution of the film will bear against the flaps 1c rather than coming in strong frictional engagement with the median portion 4c of the band. This could happen when the roll 3b has been built up to such a diameter that the free end of the liner 5 slides past the line 4a' (see FIG. 2) and cannot prevent direct engagement between the outermost convolution and the adjacent zone of the median portion 4c. Such direct engagement is prevented by the flaps 1c which keep the outermost convolution at a small distance from the line 4a'.

When the leading end of the film 3 is introduced between the sealing strips 2a, 2b and advances through the slot of the band 4 and along the inner side of the liner 5, the latter is pressed against the inner side of the band 4 and guides the film so that the film forms a helically convoluted package or roll 3b gradually expanding the band toward the internal surface of the mantle 1D. The main body portion of the mantle 1D shown in FIGS. 1 and 2 is cylindrical so that the roll 3b assumes the form of a circular cylinder and is held against unwinding by the bias of the expanded median portion 4c which subjects the outermost convolution to radial compressive stresses. As shown in FIG. 2, the median portion 4c of the band will compel the roll 3b to assume the form of a cylinder despite the fact that the portion 1f of the mantle 1D is flat and extends substantially tangentially with reference to the cylindrical main body portion of this mantle.

It was found that the force necessary to introduce the film 3 into the interior of the housing 1 may be reduced considerably if the internal surface 5a of the liner 5 is ribbed, toothed, milled, knurled or otherwise roughened so that the total area of contact between the liner 5 and film 3 is much less than in the case of full surface-to-surface contact.

It is clear that the liner 5 may be omitted or replaced by an opaque foil or liner which is applied along one side of the film to slide along the internal surface of the band 4 when the cartridge is being loaded. This foil may also consist of paper or synthetic plastic material. In such instances, the film and its liner are introduced as a unit so that the film cannot move with reference to the liner because the latter slides with the film and along the internal surface of the elastic band. FIG. 5 shows a portion of a film 103 which is provided with an opaque liner 105 of paper or the like. The liner 105 need not coat the entire film 103; it normally suffices if the leading end of the film is provided with a liner.

FIG. 3 shows that the band 4 is mounted substantially midway between the end walls 1A, 1B and that its width is but a small fraction of the axial length of the mantle 1D. However, and as shown in FIG. 4, the band 4 may be replaced by a plurality of bands which are suitably spaced from each other. FIG. 4 illustrates two narrow bands 4', 4'' which are mounted in the same way as the band 4 of FIGS. 1 to 3 and are located at the opposite ends of the mantle 1D. The bands 4', 4'' are of identical dimensions and their material has the same elasticity to make sure that the corresponding zones of the roll are subjected to identical radial compressive stresses. In FIG. 4, the bands 4', 4'' are mounted independently of each other.

FIG. 6 shows an assembly including three equidistant elastic bands 204, 204', 204'' whose terminal portions are connected with two elongated flat carriers or holders 206, 207 so that the assembly of such bands may be installed as a unit. This unit may be inserted into the mantle 1D from the one or the other axial end thereof, and the carriers 206, 207 are thereupon bonded to or otherwise safely anchored in the mantle. It can be said that the structure shown in FIG. 6 constitutes a band with three axially spaced looped median portions which are integral with two terminal portions 206, 207.

The bands 4, 4', 4'', 204, 204', 204'' may consist of a variety of elastic materials. As mentioned hereinabove, they may be made of natural or synthetic rubber sheet stock. However, it is equally possible to make such bands of interwoven elastic filaments or strips. It is also possible to assemble the bands and the liner 5 into a multilayer structure wherein the surfaces of the elastic layer are smooth but the other layer (which forms the liner) is corrugated in a manner known from the art of paper board.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the following claims.

What is claimed as new and desired to be secured by Letters Patent is:

1. A coreless film cartridge, comprising a housing defining a film-admitting mouth; and an expansible elastic band consisting at least in part of elastic material provided in said housing and comprising a looped median portion, said band having a slot through which the film advances to form within the confines of said median portion a gradually increasing roll consisting of helical convolutions, the circumferential length of said median portion in unexpanded condition of said band being less than the maximum circumferential length of the roll to be formed in said housing so that, as the diameter of the roll increases, the expanding median portion subjects the outermost convolution to radial compressive stresses and compels the roll to take the shape of a circular cylinder.

2. A coreless film cartridge, comprising a housing including a pair of spaced end walls and a mantle intermediate said end walls, said mantle defining an elongated film-admitting mouth extending between said end walls; and an expansible elastic band consisting at least in part of elastic material provided in said housing and comprising a looped median portion, said band having a slot through which the film advances to form within the confines of said median portion a gradually increasing roll consisting of helical convolutions, the width of said band being less than the length of said mouth and the circumferential length of said median portion in unexpanded condition of said band being less than the maximum circumferential length of the roll to be formed in said housing so that, as the diameter of the roll increases, the expanding median portion subjects the outermost convolution to radial compressive stresses and compels the roll to take the shape of a circular cylinder.

3. A coreless film cartridge, comprising a housing defining a film-admitting mouth; and an expansible elastic band consisting at least in part of elastic material provided in said housing and comprising a looped median portion and two terminal portions internally secured to said housing at the opposite sides of said mouth, said terminal portions defining between themselves a slot through which the film advances to form within the confines of said median portion a gradually increasing roll consisting of helical convolutions, the circumferential length of said median portion in unexpanded condition of said band being less than the maximum circumferential length of the roll to be formed in said housing so that, as the diameter of the roll increases, the expanding median portion subjects the outermost convolution to radial compressive stresses and compels the roll to take the shape of a circular cylinder.

4. A carriage as set forth in claim 3, wherein said housing comprises a mantle having a pair of inwardly extending flat panels bounding said mouth, each of said terminal portions being affixed to one of said panels.

5. A coreless film cartridge, comprising a housing including a pair of spaced end walls and a mantle intermediate said end walls, said mantle defining an elongated film-admitting mouth extending between said end walls; and an expansible elastic band consisting at least in part of elastic material provided in said housing midway between said end walls and comprising a looped median portion, said band having a slot through which the film advances to form within the confines of said median portion a gradually increasing roll consisting of helical convolutions, the width of said band being substantially less than the length of said mouth and the circumferential length of said median portion in unexpanded condition of said band being less than the maximum circumferential length of the roll to be formed in said housing so that, as the diameter of the roll increases, the expanding median portion subjects the outermost convolution to radial compressive stresses and compels the roll to take the shape of a circular cylinder.

6. A coreless film cartridge, comprising a housing including a pair of spaced end walls and a mantle located intermediate said end walls, said mantle defining an elongated film-admitting mouth extending between said end walls; and a pair of identical expansible elastic bands consisting at least in part of elastic material provided in said housing and each adjacent to one of said end walls, each of said bands comprising a looped median portion and having a slot through which the film advances to form within the confines of said median portions a gradually increasing roll consisting of helical convolutions, the circumferential length of said median portions in unexpanded condition of said bands being less than the maximum circumferential length of the roll to be formed in said housing so that, as the diameter of the roll continues to increase, the expanding median portions of said bands subject the outermost convolution to radial compressive stresses and compel the roll to take the shape of a circular cylinder.

7. A coreless film cartridge, comprising a housing defining an elongated film-admitting mouth; and an expansible elastic band consisting at least in part of elastic material provided in said housing and comprising a plurality of looped median portion spaced from each other in the longitudinal direction of said mouth, said band having a slot through which the film advances to form within the confines of said median portions a gradually increasing roll consisting of helical convolutions, the circumferential length of said median portions in unexpanded condition of said band being less than the maximum circumferential length of the roll to be formed in said housing whereby, as the diameter of the roll increases, the expanding median portions subject the outermost convolution to radial compressive stresses and compel the roll to take the shape of a circular cylinder.

8. A coreless film cartridge, comprising a housing defining an elongated film-admitting mouth; and expansible elastic band consisting at least in part of elastic material provided in said housing and comprising a looped median portion and a pair of terminal portions secured to said housing at the opposite sides of said mouth so as to define a slot which registers with said mouth and through which the film advances to form within the confines of said median portion a gradually increasing roll consisting of helical convolutions, the circumferential length of said median portion in unexpanded condition of the band being less than the maximum circumferential length of the roll to be formed in said housing so that, as the diameter of the roll increases, the expanding median portion subjects the outermost convolution to radial compressive stresses and compels the roll to take the shape of a circular cylinder; and a flexible liner provided between said median portion and the outermost convolution of the roll.

9. A film cartridge as set forth in claim 8, wherein said liner comprises an end portion which is secured to said housing adjacent to one side of said mouth.

10. A film cartridge as set forth in claim 8, wherein said liner has a roughened internal surface which is in contact with the outermost convolution of the roll following the introduction of a film through said slot.

11. A coreless film cartridge, comprising a housing defining an elongated film-admitting mouth; an expansible elastic band consisting at least in part of elastic material provided in said housing and comprising a looped median portion and a pair of terminal portions secured to said housing at the opposite sides of said mouth so as to define a slot which registers with said mouth and through which the leading end of the film advances so that such film forms within the confines of said median portion a gradually increasing roll consisting of helical convolutions, the circumferential length of said median portion in unexpanded condition of the band being less than the maximum circumferential length of the roll to be formed in said housing so that, as the diameter of the roll increases, the expanding median portion subjects the outermost convolution to radial compressive stresses and compels the roll to take the shape of a circular cylinder; and a flexible liner provided along at least a portion of the film at that side thereof which is adjacent to said median portion when the film is introduced through said slot.

12. A film cartridge as set forth in claim 11, wherein the material of said liner is opaque to prevent penetration of light to the corresponding side of the film.

13. A coreless film cartridge, comprising a housing defining a film-admitting mouth; and an expansible band consisting of interwoven elastic filaments, said band being located in the interior of said housing and comprising a looped median portion and a pair of terminal portions, said terminal portions being secured to said housing at the opposite sides of said mouth and defining between themselves a slot through which the film advances to form within the confines of said median portion a gradually increasing roll consisting of helical convolutions, the circumferential length of said median portion in unexpanded condition of said band being less than the maximum circumferential length of the roll to be formed in said housing so that, as the diameter of the roll increases, the expanding median portion subjects the outermost convolution to radial compressive stresses and compels the roll to take the shape of a circular cylinder.

14. A coreless film cartridge, comprising a housing defining a film-admitting mouth; an expansible elastic band consisting at least in part of elastic material provided in said housing and comprising a smooth-surfaced looped median portion, said band having a slot through which the film advances to form within the confines of said median portion a gradually increasing roll consisting of helical convolutions, the circumferential length of said median portion in unexpanded condition of said band being less than the maximum circumferential length of the roll to be formed in said housing so that, as the diameter of the roll increases, the expanding median portion subjects the outermost convolution to radial compressive stresses and compels the roll to take the shape of a circular cylinder; and a corrugated liner provided along that side of said median portion which is adjacent to the outermost convolution of the roll.

15. A film cartridge, comprising a housing including a pair of spaced end walls and a mantle disposed intermediate said end walls, said mantle having a substantially cylindrical main body portion and a pair of flat portions converging toward each other and provided with inwardly extending panels defining between themselves an elongated film-admitting mouth, one of said panels being substantially parallel to the corresponding flat portion of said mantle so that a portion of the film which passes between said panels is substantially tangential to said main body portion; an expansible elastic band consisting at least in part of elastic material provided in said housing and comprising a looped median portion received in said main body portion of the mantle and a pair of terminal portions each secured to said housing and each adjacent to one of said panels, said terminal portions defining between themselves a slot through which the film advances from said mouth to form within the confines of said median portion a gradually increasing roll consisting of helical convolutions, the circumferential length of said median portion being less than the maximum circumferential length of the roll to be formed in said housing so that, as the diameter of the roll increases, the expanding median portion subjects the outermost convolution to radial compressive stresses and compels the roll to take the shape of a circular cylinder; and stop means secured to the other of said panels and extending substantially tangentially of the roll when the band is expanded, said stop means being adjacent to said median portion.

16. A film cartridge as set forth in claim 15, wherein said stop means comprises at least one elongated flap extending along said mouth and in a direction away from said one panel, the length of said mouth exceeding the length of said stop means by the width of said band.

17. A film cartridge as set forth in claim 15, wherein said stop means extends nearer to the axis of said cylindrical main body portion than the terminal portion which is adjacent to said other panel so that the corresponding end of said median portion is out of contact with the outermost convolution of the roll when such outermost convolution abuts against said stop means.

18. In a coreless film cartridge, a substantially cylindrical mantle defining an elongated film-admitting mouth; and an expansible elastic band consisting at least in part of elastic material provided in said mantle and comprising a looped median portion arranged to surround the outermost convolution of a roll which is formed when a film is admitted lengthwise through said mouth and into the interior of said mantle.

19. A structure as set forth in claim 18, wherein said band comprises a pair of terminal portions affixed to said mantle at the opposite sides of said mouth and defining between themselves a slot which registers with said mouth to allow for admission of the film within the confines of said median portion.

20. A structure as set forth in claim 18, wherein the circumferential length of said median portion in unexpanded condition of said band is substantially less than the maximum circumferential length of the roll which is formed on admission of film through said mouth.

References Cited by the Examiner
UNITED STATES PATENTS

| 2,176,507 | 10/1939 | Nagel | 242—71.1 X |
| 2,187,547 | 1/1940 | Pollock | 242—71.1 |
| 2,336,278 | 12/1943 | Mihalyi. | |
| 2,484,248 | 10/1949 | Roehrl | 242—71.1 |

FOREIGN PATENTS

| 780,118 | 1/1935 | France. |
| 1,007,615 | 5/1957 | Germany. |
| 622,646 | 5/1949 | Great Britain. |

FRANK J. COHEN, *Primary Examiner.*

N. L. MINTZ, *Assistant Examiner.*